United States Patent
Liu et al.

(10) Patent No.: US 7,781,100 B2
(45) Date of Patent: *Aug. 24, 2010

(54) CATHODE MATERIAL FOR MANUFACTURING RECHARGEABLE BATTERY

(75) Inventors: Wen-Ren Liu, Taoyuan (TW); Chih-Wei Yang, Taoyuan (TW)

(73) Assignee: Advanced Lithium Electrochemistry Co., Ltd, Taoyuan (TW)

( * ) Notice: Subject to any disclaimer, the term of this patent is extended or adjusted under 35 U.S.C. 154(b) by 515 days.

This patent is subject to a terminal disclaimer.

(21) Appl. No.: 11/747,746

(22) Filed: May 11, 2007

(65) Prior Publication Data

US 2007/0207385 A1    Sep. 6, 2007

Related U.S. Application Data

(63) Continuation-in-part of application No. 11/510,096, filed on Aug. 25, 2006, now Pat. No. 7,700,236, which is a continuation-in-part of application No. 11/222,569, filed on Sep. 9, 2005, now abandoned.

(30) Foreign Application Priority Data

May 10, 2005    (TW) .............................. 94115023 A

(51) Int. Cl.
H01M 4/58    (2010.01)
H01M 4/36    (2006.01)
C01B 25/45   (2006.01)

(52) U.S. Cl. ................. 429/218.1; 252/182.1; 423/306; 429/220; 429/221; 429/223; 429/224; 429/229; 429/231.5; 429/231.6; 429/231.9; 429/231.95

(58) Field of Classification Search . 429/218.1–231.95; 252/182.1; 423/306
See application file for complete search history.

(56) References Cited

U.S. PATENT DOCUMENTS

| | | | |
|---|---|---|---|
| 7,524,529 B2 * | 4/2009 | Yang ........................... | 427/213 |
| 2005/0019670 A1 * | 1/2005 | Amine et al. ................ | 429/326 |
| 2006/0093919 A1 * | 5/2006 | Wixom et al. .......... | 429/231.95 |
| 2006/0147809 A1 * | 7/2006 | Amine et al. ................ | 429/326 |
| 2008/0113261 A1 * | 5/2008 | De Jonghe et al. .......... | 429/137 |
| 2008/0241690 A1 * | 10/2008 | Delacourt et al. ........... | 429/221 |

* cited by examiner

Primary Examiner—Wayne Langel

(57) ABSTRACT

A cathode material including a first compound and a second compound is disclosed. The first compound has a formula of $A_{3x}M1_{2y}(PO_4)_3$ and includes plural micrometer-sized secondary particles, each of which has a particle size larger than 1 μm and is composed of crystalline nanometer-sized primary particles, each of which has a particle size ranging from 10 to 500 nm. The second compound is at least one compound selected from the group consisting of SiC, BN and metal oxide having a formula of $M2_aO_b$ and is coated on the first compound. A is at least one element selected from the group consisting of Groups IA, IIA and IIIA; each of M1 and M2 is at least one element selected from the group consisting of Groups IIA, IIIA, IVA and VA and transition metal elements, respectively; and $0<x\leq1.2$, $1.2\leq y\leq1.8$, $0<a\leq7$, and $0<b\leq6$.

20 Claims, 10 Drawing Sheets

CATHODE MATERIAL FOR MANUFACTURING RECHARGEABLE BATTERY

CROSS-REFERENCE TO RELATED APPLICATION

This application is a continuation-in-part of U.S. patent application Ser. No. 11/510,096, filed on Aug. 25, 2006, and entitled "CATHODE MATERIAL FOR MANUFACTURING A RECHARGEABLE BATTERY", which is a continuation-in-part of U.S. patent application Ser. No. 11/222,569, filed on Sep. 9, 2005, and entitled "METHOD FOR MAKING A LITHIUM MIXED METAL COMPOUND". The entire disclosures of the above applications are all incorporated herein by reference.

BACKGROUND OF THE INVENTION

1. Field of the Invention

This invention relates to a cathode material for manufacturing a cathode of a rechargeable battery, and more particularly to a cathode material including a first compound and a second compound for manufacturing a cathode of a rechargeable battery. This invention also relates to a cathode and a rechargeable battery with a cathode employing the cathode material.

2. Description of the Related Art

Along with diversified development of electronic products, there is increasing need for portable power supplies. For example, electronic consumer products, medical devices, motorcycles, automobiles, and power tools and the like require a portable power supply for power source. For current portable power supplies, rechargeable batteries are relatively popular. Since lithium rechargeable batteries have a high ratio of volume to capacity, pollution-free and recyclable charge/discharge properties, and no memory effect, it has a great development potential in the future.

Additionally, a cathode material used for manufacture of the cathode plays an important role in the performance of the rechargeable battery. Among the known cathode materials, since lithium ferrous phosphate compounds and the related compounds having similar properties to $LiFePO_4$ compounds, such as $LiMPO_4$, in which M represents transition metal elements, e.g., manganese (Mn), cobalt (Co), and nickel (Ni), are environmentally benign, relatively stable and abundant, and have relatively good electrochemical properties, e.g., high specific capacity, good charge/discharge cycling performance, and good thermostability, they have been evaluated to be the cathode material with greatest development potential.

However, at present, there is a difference between practical and theoretical electrochemical properties of known $LiFePO_4$ compounds and the related compounds. For example, the theoretical specific capacity of $LiFePO_4$ compounds and the related compounds is about 170 mAh/g, whereas the $LiFePO_4$ compounds disclosed in U.S. Pat. No. 5,910,382 have a specific capacity of about 95 mAh/g, which is far below the theoretical specific capacity. In order to improve the capacity property of the $LiFePO_4$ compounds, it has been proposed to add other elements to the $LiFePO_4$ compounds having one of olivine and NASICON structures so as to increase the capacity property of the $LiFePO_4$ compounds, see U.S. Pat. Nos. 6,716,372 and 6,815,122. However, since the elements used for substituting iron are not easily available, production cost is relatively high.

In addition, U.S. Pat. No. 6,632,566 (hereinafter referred to as the '566 patent) discloses increase in the specific surface of the $LiFePO_4$ compound powders in favor of diffusion of lithium ions in the powders, thereby enhancing capacity of a cathode material made from the $LiFePO_4$ compound powders. Particularly, the cathode material described in the '566 patent is produced by sintering the $LiFePO_4$ compound powders at a suitable temperature in such a manner that the cathode material thus formed is composed of separate single-phase crystalline particles having a grain size not larger than 10 μm. However, the $LiFePO_4$ compound powders included in the cathode material have a relatively large particle size, the rechargeable battery with the cathode material of the '566 patent isn't good enough at the charge/discharge properties. Besides, since the charge/discharge rate of the rechargeable battery with the cathode material of the '566 patent is about C/37, which is calculated based on data shown in the Examples of the '566 patent, such charge/discharge rate is too low for practical application and needs to be improved.

Since conductivity and lithium ion diffusion rate of lithium ferrous phosphate are still relatively low, the specific capacity will decrease at a high charge/discharge rate so that use of such lithium ferrous phosphate in high current density applications is restricted. In order to improve the conductivity of such lithium ferrous phosphate, it has been proposed to further reduce particle size of lithium ferrous phosphate or add conductive material to lithium ferrous phosphate. For example, Japanese Patent Publication No. 2003-323892 (hereinafter referred to as the '892 publication) discloses a method for making a cathode material, which involves mixing lithium ferrous phosphate powders, conductive metal particles and a polar solvent in a hermetic container at a temperature ranging from 100° C. to 250° C. Since the method of the '892 publication is required to be conducted at a relatively high temperature and pressure, and since the activity of the conductive metal particles is relatively high, it is difficult to control operating conditions in the method of the '892 publication and hence, production cost of the method is relatively expensive.

Another approach to mix conductive material with the lithium ferrous phosphate involves addition of organic material to a reactant mixture containing lithium ferrous phosphate. For example, in a solid-phase mixing process, lithium salt, iron salt, and phosphate are formed into lithium ferrous phosphate powders, while the organic material is pyrolyzed to produce alkane and alkene gases, and conductive carbonaceous materials that are scattered in the lithium ferrous phosphate powders. However, the pyrolyzed products, i.e., alkane and alkene gases, cause environmental pollution and raise environmental concerns. Accordingly, this method is not recommended.

The grandparent U.S. patent application Ser. No. 11/222,569 (hereinafter referred to as the '569 application) discloses a method for making a lithium mixed metal compound, such as the lithium ferrous phosphate compounds having an olivine structure. The method disclosed in the '569 application includes steps of preparing a reactant mixture that comprises ion sources of the lithium ferrous phosphate compounds, and exposing the reactant mixture to a non-oxidizing atmosphere in the presence of suspended carbon particles. The lithium ferrous phosphate compounds thus made are in powder form and have relatively small particle size and carbon are even distributed.

The parent U.S. patent application Ser. No. 11/510,096 (hereinafter referred to as the '096 application) discloses a cathode material that has one of olivine and NASICON structures and that includes micrometer-sized secondary particles, each of which is composed of crystalline nanometer-sized primary particles of a metal compound. The cathode material may be produced by modifying the method called for in the '569 application. Compared with the conventional cathode material, the cathode material of '096 application has an improved specific surface area and capacity. In addition, the cathode material of '096 application is compatible with various binders, particularly aqueous binders, and aqueous solvents, particularly deionized water, and can be easily coated on and firmly adhered to the electrode plate.

However, there is still a need in the art to provide a cathode material with relatively small particle size and relatively excellent conductivity that can satisfy electrochemical properties and that can be produced by an economical and environmental friendly method.

SUMMARY OF THE INVENTION

Therefore, the objective of the present invention is to provide a cathode material that can avoid the aforesaid problems encountered in the prior arts.

According to one aspect of this invention, a cathode material includes a first compound and a second compound. The first compound has a formula of $A_{3x}M1_{2y}(PO_4)_3$ and includes plural micrometer-sized secondary particles, each of which has a particle size larger than 1 μm and is composed of crystalline nanometer-sized primary particles, each of which has a particle size ranging from 10 to 500 nm. The second compound is at least one compound selected from the group consisting of SiC, BN and metal oxide having a formula of $M2_aO_b$, and is coated on the first compound. A is at least one element selected from the group consisting of Groups IA, IIA and IIIA; each of M1 and M2 is at least one element selected from the group consisting of Groups IIA, IIIA, IVA and VA and transition metal elements, respectively; and $0<x\leq1.2$, $1.2\leq y\leq1.8$, $0<a\leq7$, and $0<b\leq6$.

According to another aspect of this invention, a cathode for a rechargeable battery includes an electrode plate and a coating of a cathode material on the electrode plate. The cathode material includes a first compound and a second compound. The first compound has a formula of $A_{3x}M1_{2y}(PO_4)_3$ and includes plural micrometer-sized secondary particles, each of which has a particle size larger than 1 μm and is composed of crystalline nanometer-sized primary particles, each of which has a particle size ranging from 10 to 500 nm. The second compound is at least one compound selected from the group consisting of SiC, BN and metal oxide having a formula of $M2_aO_b$, and is coated on the first compound. A is at least one element selected from the group consisting of Groups IA, IIA and IIIA; each of M1 and M2 is at least one element selected from the group consisting of Groups IIA, IIIA, IVA and VA and transition metal elements, respectively; and $O<x\leq1.2$, $1.2\leq y\leq1.8$, $0<a\leq7$, and $0<b\leq6$.

According to further another aspect of this invention, a rechargeable battery includes an anode, an electrolyte, and a cathode made from a cathode material. The cathode material includes a first compound and a second compound. The first compound has a formula of $A_{3x}M1_{2y}(PO_4)_3$ and includes plural micrometer-sized secondary particles, each of which has a particle size larger than 1 μm and is composed of crystalline nanometer-sized primary particles, each of which has a particle size ranging from 10 to 500 nm. The second compound is at least one compound selected from the group consisting of SiC, BN and metal oxide having a formula of $M2_aO_b$, and is coated on the first compound. A is at least one element selected from the group consisting of Groups IA, IIA and IIIA; each of M1 and M2 is at least one element selected from the group consisting of Groups IIA, IIIA, IVA and VA and transition metal elements, respectively; and $0<x\leq1.2$, $1.2\leq y\leq1.8$, $0<a\leq7$, and $0<b\leq6$.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
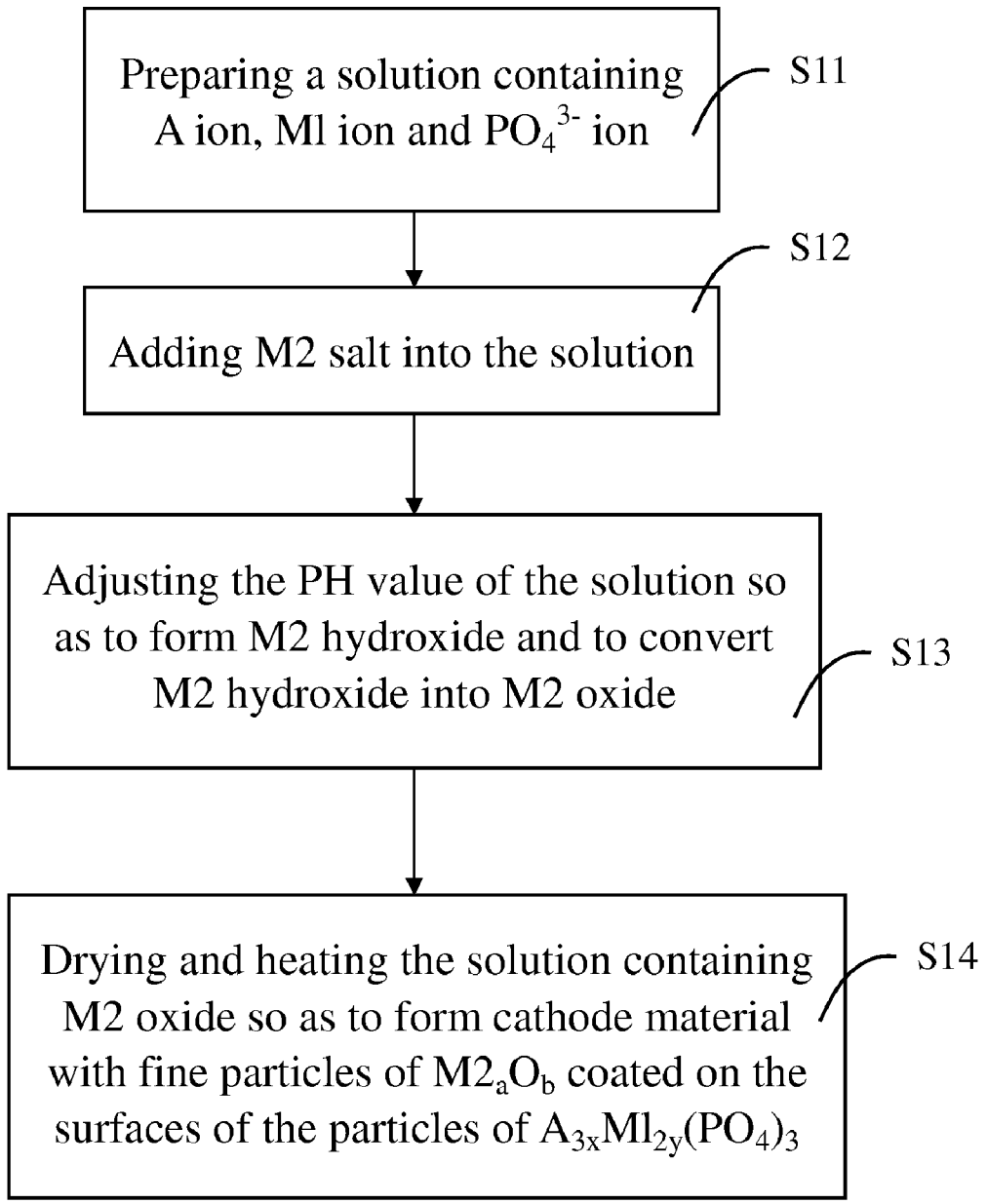
FIG. 1 shows a process of manufacturing the cathode material for a rechargeable battery according to a preferred embodiment of the present invention.

According to this invention, a cathode material includes a first compound having a formula of $A_{3x}M1_{2y}(PO_4)_3$, and a second compound being at least one compound selected from the group consisting of SiC, BN and metal oxide having a formula of $M2_aO_b$, wherein A represents at least one element selected from the group consisting of Groups IA, IIA and IIIA; each of M1 and M2 independently represents at least one element selected from the group consisting of Groups IIA, IIIA, IVA and VA and transition metal elements; and $0<x\leq1.2$, $1.2\leq y\leq1.8$, $0<a\leq7$, and $0<b\leq12$. The first compound includes micrometer-sized secondary particles having a particle size larger than 1 μm. Each of the micrometer-sized secondary particles is composed of crystalline nanometer-sized primary particles of a metal compound having a particle size ranging from 10 to 500 nm.

Preferably, in the formula $A_{3x}M1_{2y}(PO_4)_3$ of the first compound and the formula $M2_aO_b$ of the metal oxide, A is at least one element selected from the group consisting of Li, Na, K, Be, Mg, B, and Al, and each of M1 and M2 is at least one element selected from the group consisting of Sc, Ti, V, Cr, Mn, Fe, Co, Ni, Cu, Zn, Y, Zr, Nb, Mo, Be, Mg, Ca, Sr, B, Al, Sn, Ga, In, Si, and Ge, respectively. More preferably, the first compound has an olivine or NASICON structure. One of non-limiting examples of the first compound is lithium ferrous phosphate ($LiFePO_4$).

Additionally, the second compound is preferably selected from the group consisting of $ZnAlOz$, $CuO$, $ZnO$, $Al_2O_3$, $SiO_2$, $CoO$, $MgO$, $NiO$, $V_2O_5$, $TiO_2$, $CuO$, $MnO$, $SiC$ and $BN$, wherein the subscript z represents the number of oxygen atoms for balancing with valences of zinc and aluminum atoms.

Amount of the second compound included in the cathode material can be adjusted according to the desired properties or application of the cathode material composition. Preferably, the second compound is substantially present in an amount ranging form 0.1% to 5% by weight based on total weight of the cathode material.

The preferred embodiment of a cathode material according to this invention includes a first compound having micrometer-sized secondary particles having a particle size ranging from 1 to 50 μm. Each of the micrometer-sized secondary particles is composed of crystalline nanometer-sized primary particles of a metal compound having a particle size ranging from 10 to 500 nm. Preferably, each of the micrometer-sized secondary particles is formed by sintering of contacted portions of surfaces of adjacent ones of the crystalline nanometer-sized primary particles. More preferably, the cathode material of this invention further includes a carbonaceous component. Most preferably, the cathode material of this invention further includes carbon particles adhered to the surfaces of the crystalline nanometer-sized primary particles of each of the micrometer-sized secondary particles. In addition, the carbon particles is substantially present in an amount less than 5% by weight based on total weight of the cathode material. Moreover, the cathode material of this invention is preferred to have a BET specific surface area ranging from 5 to 100 $m^2/g$.

Referring to FIG. 1, the cathode material for a rechargeable battery according to a preferred embodiment of the present invention can be manufactured by the following steps: preparing a solution containing A ion, M1 ion, and $PO_4^{3-}$ ion (Step S11); adding M2 salt into the solution (Step S12); adjusting the PH value of the solution so as to form M2 hydroxide and to convert M2 hydroxide into M2 oxide (Step S13); and heating the solution containing M2 oxide so as to form the cathode material with fine particles of $M2_aO_b$ dispersed in an aggregation of particles of $A_{3x}M1_{2y}(PO_4)_3$ and coated on the surfaces of the particles of $A_{3x}M1_{2y}(PO_4)_3$ (Step S14).

Figure 2:
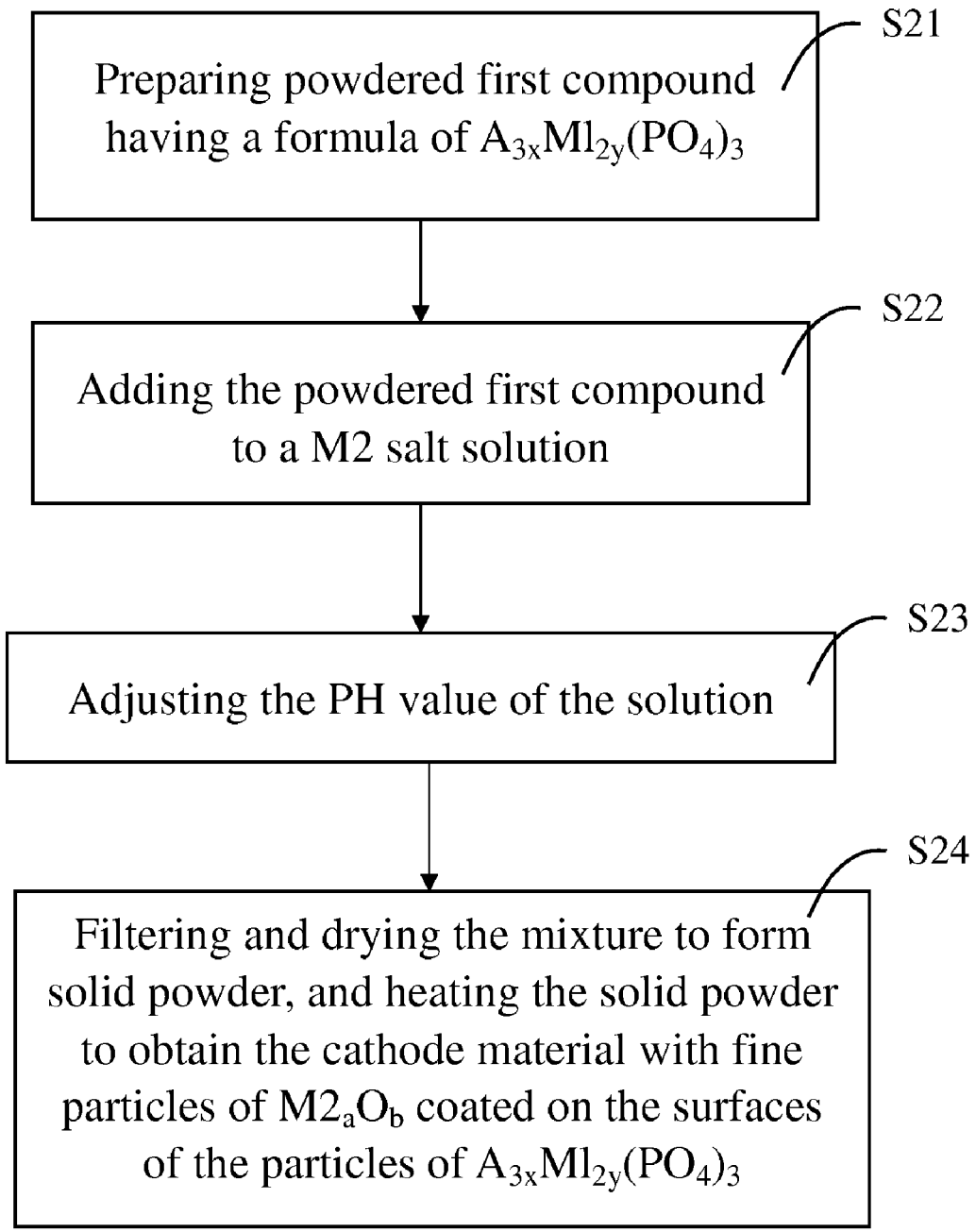
FIG. 2 shows a process of manufacturing the cathode material for a rechargeable battery according to another preferred embodiment of the present invention.

Alternatively, referring to FIG. 2, the cathode material can be prepared by the following steps: preparing powdered first compound having a formula of $A_{3x}M1_{2y}(PO_4)_3$ (Step S21); adding the powdered first compound to a M2 salt solution (Step S22); adjusting the PH value of the solution based on the relationship between solubility of M2 hydroxide and the PH value so as to minimize the solubility of M2 hydroxide and so as to disperse uniformly M2 hydroxide particles in the powdered first compound and on the surfaces of the powdered first compound (Step S23); and filtering and drying the mixture thus obtained so as to form solid powders. The solid powders are subsequently heated at a temperature ranging from 50 to 900° C. according to the properties of M2 oxide thus formed so as to obtain the cathode material with fine particles of $M2_aO_b$ dispersed in an aggregation of particles of $A_{3x}M1_{2y}(PO_4)_3$ and coated on the surfaces of the particles of $A_{3x}M1_{2y}(PO_4)_3$ (Step S24).

Preferably, adjustment of the PH value of the solution in the above methods is conducted through addition of ammonia solution.

The above-mentioned powdered first compound having a formula of $A_{3x}M1_{2y}(PO_4)_3$ of the cathode material may be manufactured by a method involving formation of particulate precursors of the metal compound followed by crystallization of the metal compound of the particulate precursors to form the crystalline nanometer-sized primary particles and sintering of the crystalline nanometer-sized primary particles.

Figure 3:
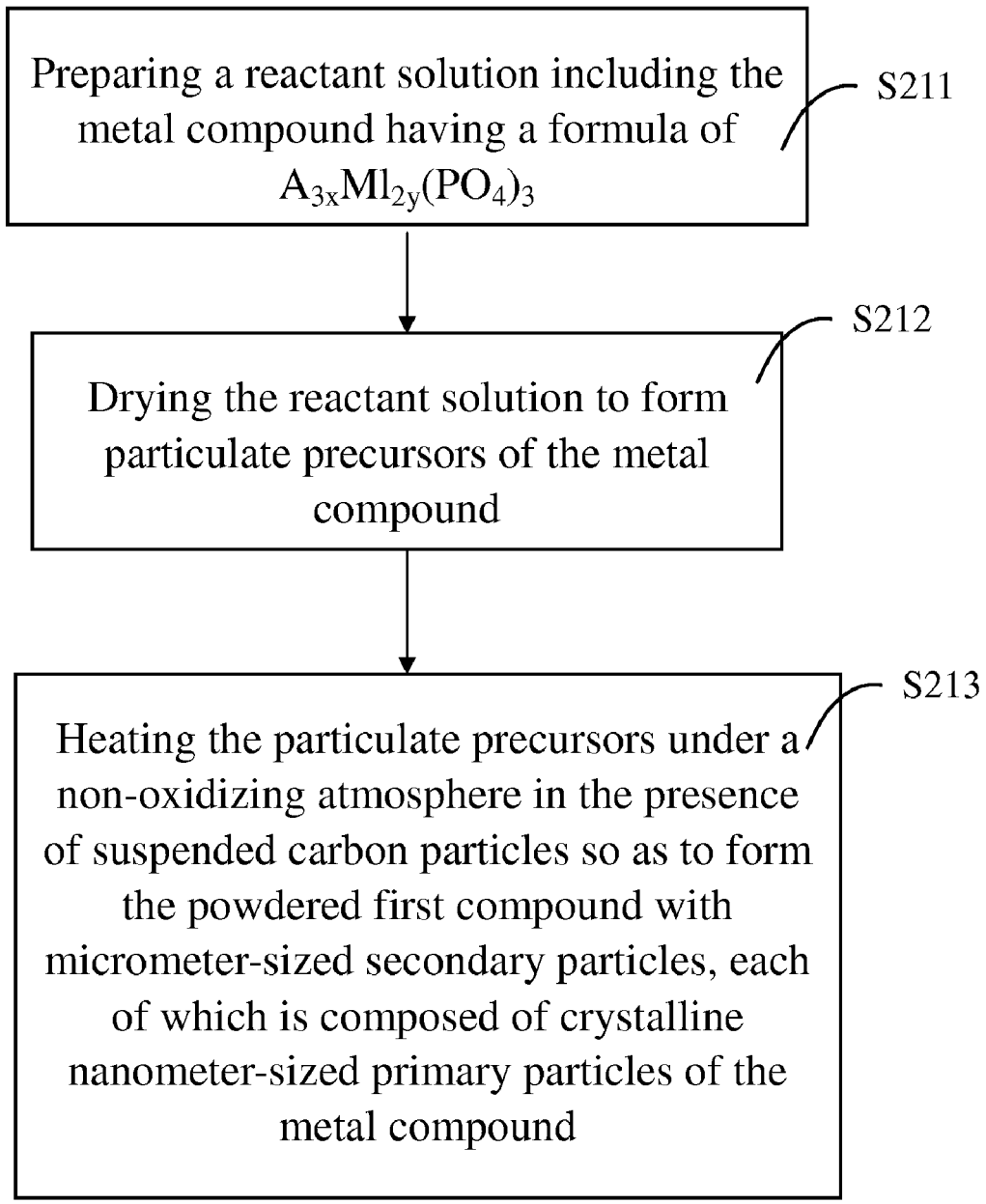
FIG. 3 shows a process of manufacturing the powdered first compound of the cathode material according to a preferred embodiment of the present invention.

Particularly, referring to FIG. 3, the method of preparing powdered first compound having a formula of $A_{3x}M1_{2y}(PO_4)_3$ includes the following steps: preparing a reactant solution including the metal compound, the metal compound having a formula of $A_{3x}M1_{2y}(PO_4)_3$, in which A represents at least one element selected from the group consisting of Groups IA, IIA and IIIA; M1 represents at least one element selected from the group consisting of Groups IIA, IIIA, IVA and VA and transition metal elements, and $0<x\leq1.2$, $1.2\leq y\leq1.8$ (Step S211); drying the reactant solution to form particulate precursors of the metal compound (Step S212); and heating the particulate precursors under a non-oxidizing atmosphere in the presence of suspended carbon particles so as to crystallize the metal compound of each of the particulate precursors to form the crystalline nanometer-sized primary particles and so as to cause sintering of contacted portions of surfaces of adjacent ones of the crystalline nanometer-sized primary particles to form each of the micrometer-sized secondary particles (Step S213). Therefore, the powdered first compound having a formula of $A_{3x}M1_{2y}(PO_4)_3$ is prepared.

At the Step S212, drying operation of the reactant solution may be conducted through dehydration, ultrasonic spray-drying, freeze-drying, vacuum-drying, filtering, or spray pyrolysis techniques.

At the Step S213, heating operation of the particulate precursors is preferably conducted at a temperature ranging from 400° C. to 900° C. for 6 to 48 hours.

Alternatively, the above-mentioned powdered first compound having a formula of $A_3M1_{2y}(PO_4)_3$ of the cathode material may be manufactured by a method involving heating of particulate precursors to form the crystalline nanometer-sized primary particles, subsequently granulating the crystalline nanometer-sized primary particles to form the micrometer-sized secondary particles, and followed by sintering of the crystalline nanometer-sized primary particles of each of the micrometer-sized secondary particles.

Figure 4:
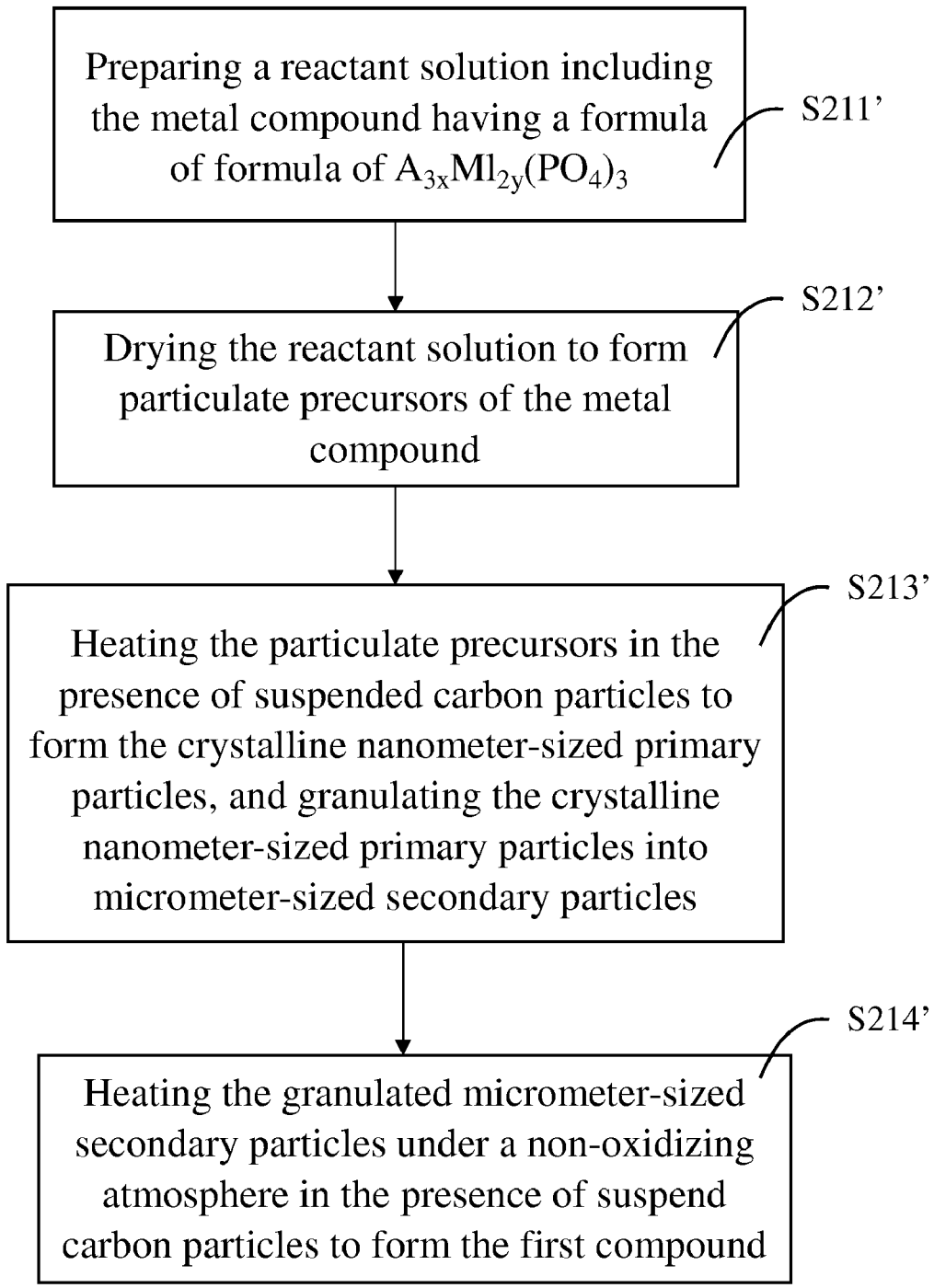
FIG. 4 shows another process of manufacturing the powdered first compound of the cathode material according to a preferred embodiment of the present invention.

Particularly, referring to FIG. 4, the alternative method of preparing powdered first compound having a formula of $A_{3x}M1_{2y}(PO_4)_3$ includes the following steps: preparing a reactant solution including the metal compound having a formula of $A_{3x}M1_{2y}(PO_4)_3$, in which A represents at least one element selected from the group consisting of Groups IA, IIA and IIIA; M1 represents at least one element selected from the group consisting of Groups IIA, IIIA, IVA and VA and transition metal elements; and $0<x\leq1.2$, $1.2\leq y\leq1.8$ (Step S211'); drying the reactant solution to form particulate precursors of the metal compound (Step S212'); heating the particulate precursors in the presence of suspended carbon particles so as to crystallize the metal compound of each of the particulate precursors to form the crystalline nanometer-sized primary particles, and granulating the crystalline nanometer-sized primary particles into micrometer-sized secondary particles (Step S213'); and heating the granulated micrometer-sized secondary particles under a non-oxidizing atmosphere in the presence of suspended carbon particles so as to cause sintering of contacted portions of surfaces of adjacent ones of the crystalline nanometer-sized primary particles of each of the micrometer-sized secondary particles (Step S214'). Therefore, the powdered first compound having a formula of $A_{3x}M1_{2y}(PO_4)_3$ is prepared.

Preferably, at the Step S213,' the heating operation of the particulate precursors is conducted at a temperature ranging from 550° C. to 600° C. for 2 to 24 hours. Preferably, heating operation of the granulated micrometer-sized secondary particles is conducted at a temperature ranging from 400° C. to 900° C. for 6 to 48 hours.

In addition, during manufacture of the powdered first compound having a formula of $A_{3x}M1_{2y}(PO_4)_3$ according to the above-mentioned methods, a carbonaceous component is optionally added into the reactant solution prior to the drying operation of the reactant solution. The carbonaceous component is one of an organic acid selected from the group consisting of citric acid, oxalic acid, tartaric acid, lactic acid, terephthalic acid, ethylenediaminetetraacetic acid, and acetic acid; a carbohydrate selected from the group consisting of sucrose, lactose, glucose, and oligose; and carbon powders made from a material selected from the group consisting of acetylene carbon black, carbon black, mesophase carbon micro beads (MCMB), super P and graphite.

Figure 5:
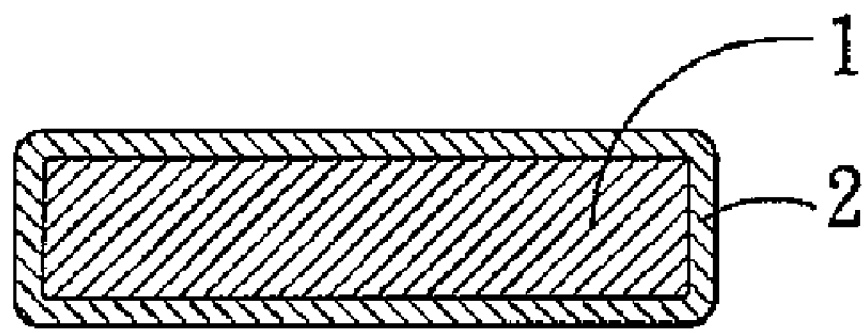
FIG. 5 is a schematic sectional view to illustrate structure of a cathode for a rechargeable battery according to this invention.

Referring to FIG. 5, the preferred embodiment of a cathode for a rechargeable battery according to this invention includes an electrode plate 1, and a coating layer 2 of the above-mentioned cathode material of this invention coated on the electrode plate 1.

Preferably, the cathode material further includes an aqueous binder, in addition to an aqueous solvent. More preferably, the aqueous binder is styrene-butadiene rubber (SBR). More preferably, the aqueous solvent is deionized water.

Alternatively, the cathode material may further include a non-aqueous binder. Preferably, the non-aqueous binder is polyvinylidene fluoride (PVDF). Preferably, the non-aqueous solvent is N-methyl-pyrrolidone (NMP).

Preferably, the cathode material may further include a thickener. More preferably, the thickener is carboxymethyl cellulose (CMC).

In addition, the preferred embodiment of the cathode thus made may be combined with an anode and an electrolyte to form the rechargeable battery.

EXAMPLES

Example A 4,050 g of phosphoric acid and 625 g of citric acid were mixed and dissolved in 15 liters of deionized water to form an acidic solution. 1,080 g of iron powders were added into and dissociated in the acidic solution so as to form ferric phosphate and ferrous phosphate in the acidic solution. After the iron powders were dissociated completely, 485 g of zinc chloride was added into and dispersed in the acidic solution with agitation by a mixer.

1,500 g of lithium hydroxide was dissolved in 15 liters of water so as to form a basic solution. The basic solution was then added into the acidic solution. The PH value of the combined solution was adjusted to 8.5 through addition of ammonia water. By this time, zinc chloride was dissociated to form zinc hydroxide ($Zn(OH_2)$) due to neutralization. In addition, since neutralization is an exothermic reaction, zinc hydroxide thus formed was subsequently converted to zinc oxide (ZnO) by the heat generated from the neutralization.

Next, the combined solution was spray-dried so as to form fine powders. The fine powders were placed in an alumina crucible which was placed in a furnace chamber where carbon powders were placed. Temperature of the furnace chamber was raised to 800° C. by a rate of 5° C./min, and the fine powders were maintained at 800° C., under a nitrogen environment for 8 hours. The product thus obtained was in powdered form ($LiFePO_4/ZnO/C$) having an aggregation of particles of lithium ferrous phosphate in which zinc oxide and carbonaceous materials are dispersed and on which zinc oxide and carbonaceous material are coated. In addition, the cathode material includes micrometer-sized secondary particles having a particle size larger than 1 μm. Each of the micrometer-sized secondary particles is composed of crystalline nanometer-sized primary particles of a metal compound $LiFePO_4$ having a particle size ranging from 10 to 500 nm.

Next, the cathode material was evenly mixed with carbon black and polyvinylidene fluoride (PVDF) in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 400 Automated Test System (Maccor Inc., Tulsa, Okla., U.S.A.).

Comparative Example A 4.196 g of lithium hydroxide, 17.99 g of ferrous oxalate and 11.53 g of phosphate were added into 200 ml of deionized water to form a solution. The solution was dried after being mixed thoroughly so as to form fine powders. The fine powders were placed in a furnace chamber. Temperature of the furnace chamber was raised to 80° C. by a rate of 5° C./min, and the fine powders were maintained at 800° C. under a nitrogen environment for 8 hours. The temperature of the furnace chamber was then cooled to the room temperature. Powdered lithium ferrous phosphate was obtained.

Next, the powdered lithium ferrous phosphate thus formed was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 4000 Automated Test System (Maccor Inc., Tulsa, Okla., U.S.A.).

Example B 2,880 g of phosphoric acid and 313 g of citric acid were mixed and dissolved in 10 liters of deionized water to form an acidic solution. 1,396 g of iron powders were added into and dissociated in the acidic solution so as to form ferric phosphate and ferrous phosphate. Addition of citric acid can accelerate dissociation of the iron powders and formation of ferric phosphate and ferrous phosphate. 1,049 g of lithium hydroxide was dissolved in 10 liters of water so as to form a non-acidic solution. The non-acidic solution was then added into the acidic solution. The combined solution was subsequently spray-dried to form fine powders.

The fine powders were placed in an alumina crucible and the crucible was placed in a furnace chamber. Temperature of the furnace chamber was raised to 700° C. by a rate of 5° C./min, and the fine powders were maintained at 700° C. under a nitrogen environment for 8 hours. Powdered lithium ferrous phosphate was formed.

1.4 g of zinc chloride and 1.2 g of aluminum chloride were dissolved in 150 ml of deionized water, and the solution thus obtained was added with lithium ferrous phosphate powders to form a slurry. 1.5 ml of ammonia solution was added into the slurry, and the PH value of the slurry was changed from about 4.5 to about 8.5. The slurry was then filtered. The filtered cake was placed in an alumina crucible and the crucible was placed in a furnace chamber. Temperature of the furnace chamber was raised to 800° C., under a rate of 5° C./min, and the filtered cake was maintained at 800° C., at a nitrogen environment for 8 hours. The product obtained is in powdered form ($LiFePO_4/ZnAlO_z/C$) having an aggregation of particles of lithium ferrous phosphate in which zinc aluminum oxide and carbonaceous materials are dispersed and on which zinc aluminum oxide and carbonaceous material are coated. In addition, the cathode material includes micrometer-sized secondary particles having a particle size larger than 1 µm. Each of the micrometer-sized secondary particles is composed of crystalline nanometer-sized primary particles of a metal compound $LiFePO_4$ having a particle size ranging from 10 to 500 nm.

In this example, the carbonaceous material dispersed in and coated on the aggregation of particles of lithium ferrous phosphate is obtained from citric acid, and has a non-conductive $sp^3$ structure. Hence, the effect of zinc aluminum oxide on electrochemical properties of lithium ferrous phosphate can be measured without interference from the carbonaceous material.

Next, the cathode material was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 4000 Automated Test System (Maccor Inc., Tulsa, Okla., U.S.A.).

Comparative Example B 50 g of the reactant powders were placed in an alumina crucible and the crucible was placed in a furnace chamber. Temperature of the furnace chamber was raised to 800° C. by a rate of 5° C./min, and the fine powders were maintained at 800° C. under a nitrogen environment for 8 hours. The temperature of the furnace chamber was then cooled to room temperature. Powdered lithium ferrous phosphate was obtained.

Next, the lithium ferrous phosphate powders were evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 4000 Automated Test System (Maccor Inc., Tulsa, Okla., U.S.A.).

Example C 11.5 g of phosphoric acid, 1 g of citric acid, and 1 g of sucrose were dissolved in 100 ml of deionized water to form an acidic solution. 5.6 g of iron powders were added into and dissociated in the acidic solution so as to form ferric phosphate and ferrous phosphate. After the iron powders were completely dissociated, 0.72 g of copper nitrate was added into and mixed with the acidic solution. 4.2 g of lithium hydroxide was dissolved in 100 ml of water so as to form a non-acidic solution which was then added into the acidic solution to conduce neutralization. By this time, the pH value of the combined solution was slightly lower than 7. Then, the pH value of the combined solution was adjusted to about 8 through addition of ammonia water. The combined solution was dried after mixing so as to form fine powders. The fine powders were placed in an alumina crucible and the crucible was placed in a furnace chamber where carbon powders were placed. Temperature of the furnace chamber was raised to 800° C. by a rate of 5° C./min, and the fine powders were maintained at 800° C. under a nitrogen environment for 8 hours. The furnace chamber was subsequently cooled to room temperature. The product thus obtained was in powdered form ($LiFePO_4/CuO/C$) having an aggregation of particles of lithium ferrous phosphate in which copper oxide and carbonaceous materials are dispersed and on which copper oxide and carbonaceous material are coated. In addition, the cathode material includes micrometer-sized secondary particles having a particle size larger than 1 µm. Each of the micrometer-sized secondary particles is composed of crystalline nanometer-sized primary particles of a metal compound $LiFePO_4$ having a particle size ranging from 10 to 500 nm.

Next, the cathode material was evenly mixed with carbon black and polyvinylidene fluoride in a weight ratio of 80:10:10 to form a mixture. The mixture was then coated on an aluminum foil and was dried to produce a cathode specimen. The cathode specimen was combined with lithium metal to form a 2032 type button rechargeable battery. Charge/discharge tests were performed on the button rechargeable battery thus formed using a Maccor Series 4000 Automated Test System (Maccor Inc., Tulsa, Okla., U.S.A.).

Results of Evaluation Tests

Electrochemical Reversibility

Figure 6:
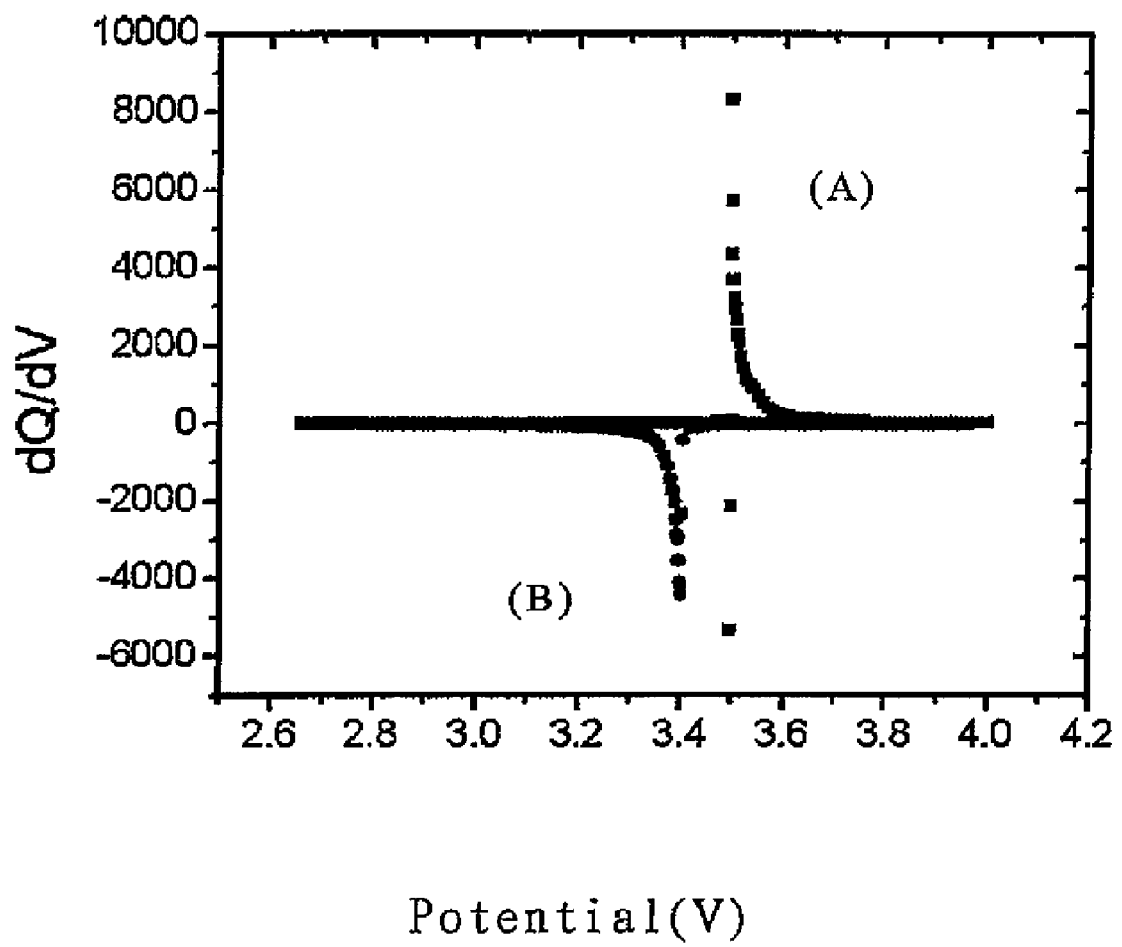
FIG. 6 shows an differential capacity (dQ/dv) versus voltage (v) plot for a rechargeable battery with a cathode made from a cathode material obtained from Example A of this invention.
Figure 7:
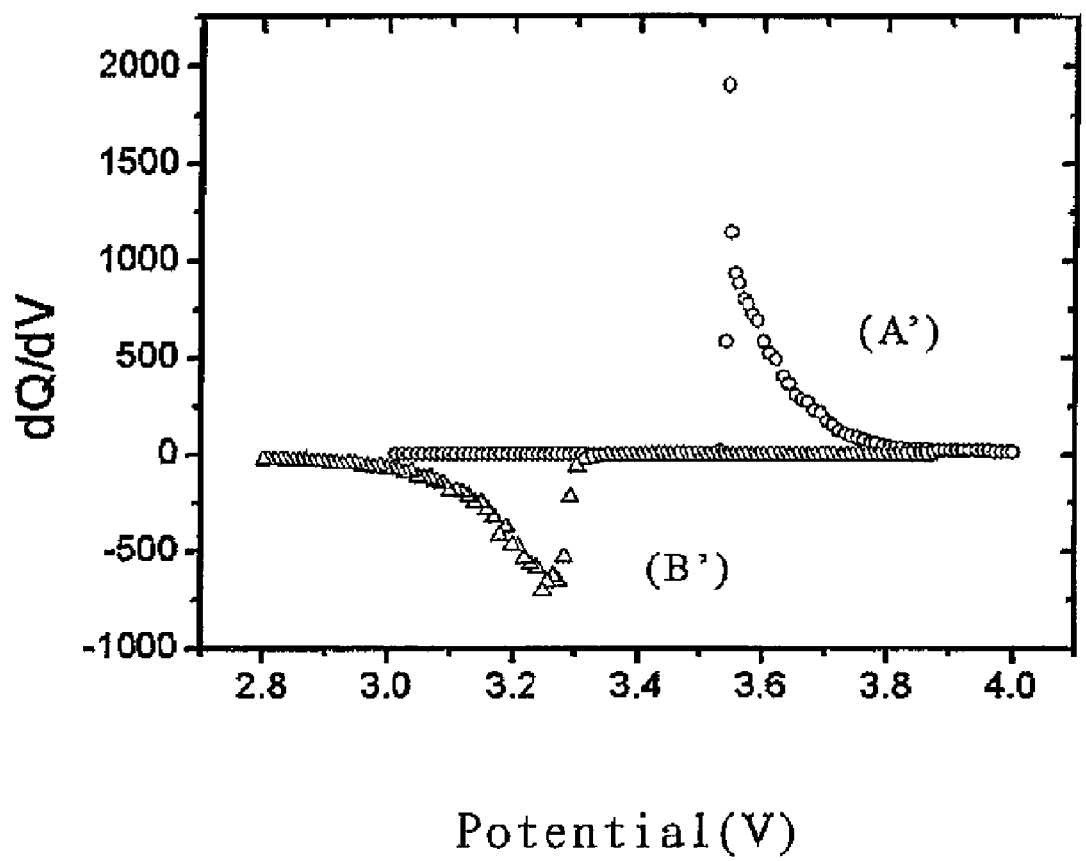
FIG. 7 shows an differential capacity (dQ/dv) versus voltage (v) plot for a rechargeable battery with a cathode made from a cathode material obtained from comparative Example A.

FIGS. 6 and 7 show differential capacity (dQ/dV) versus voltage (V) plots for cathodes made from the cathode material ($LiFePO_4/ZnO/C$) in the rechargeable battery of Example A of this invention and the lithium ferrous phosphate powders in the rechargeable battery of comparative Example A, respectively. The applied charge/discharge voltage ranges from 2.8V to 4.0V and the charge/discharge rate is set to C/5.

From the results shown in FIG. 6 (Example A) and 7 (Comparative Example A), the charge peak (curve A) and the discharge peak (curve B) of the cathodes of the rechargeable battery of Example A are very close to each other and occur at 3.5 V and 3.40 V, respectively, which is an indication of an excellent electrochemical reversibility. On the other hand, the charge peak (curve A') and the discharge peak (curve B') of the cathode of the rechargeable battery of Comparative Example A are far from each other and occur at 3.55V and 3.25V, respectively, which is an indication of a poor electrochemical reversibility.

Capacity

Figure 8:
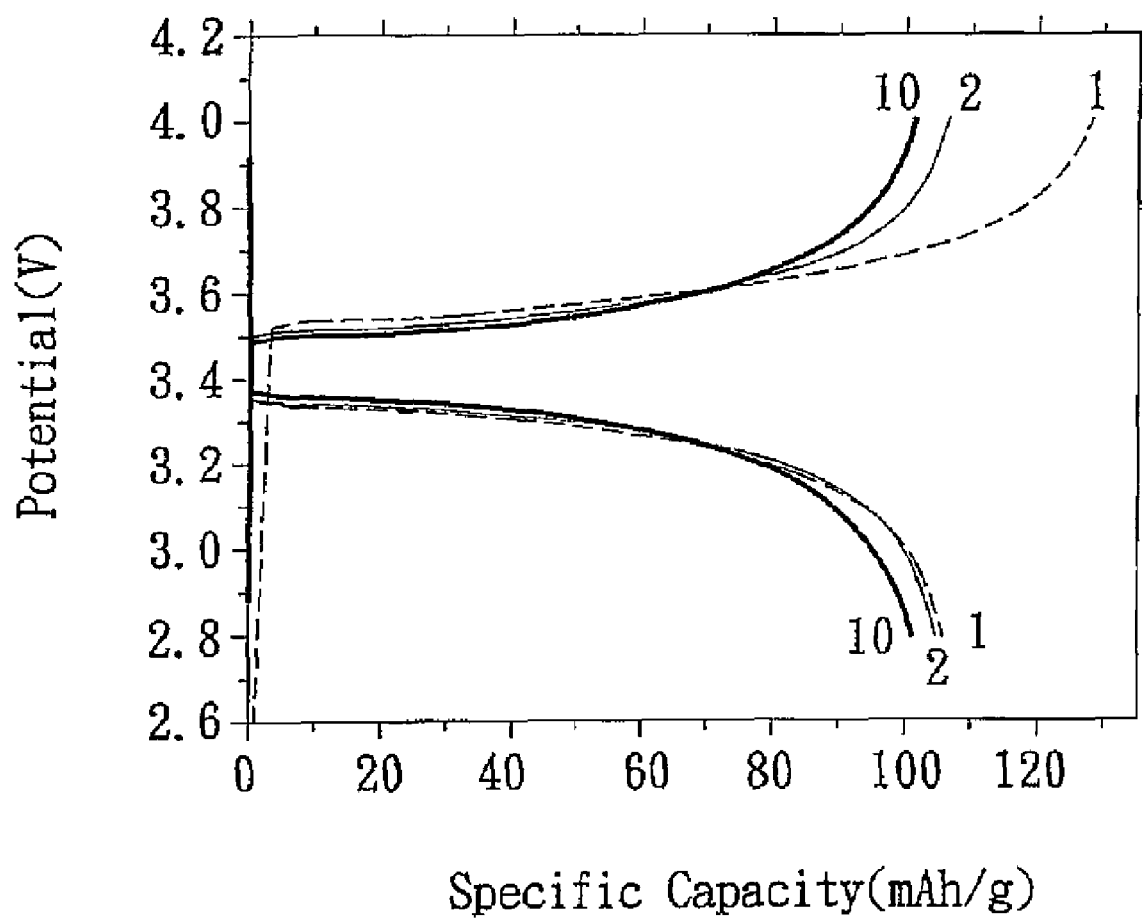
FIG. 8 shows a specific capacity (Q) versus voltage (V) plot for a rechargeable battery with a cathode made from a cathode material obtained form Example B of this invention.
Figure 9:
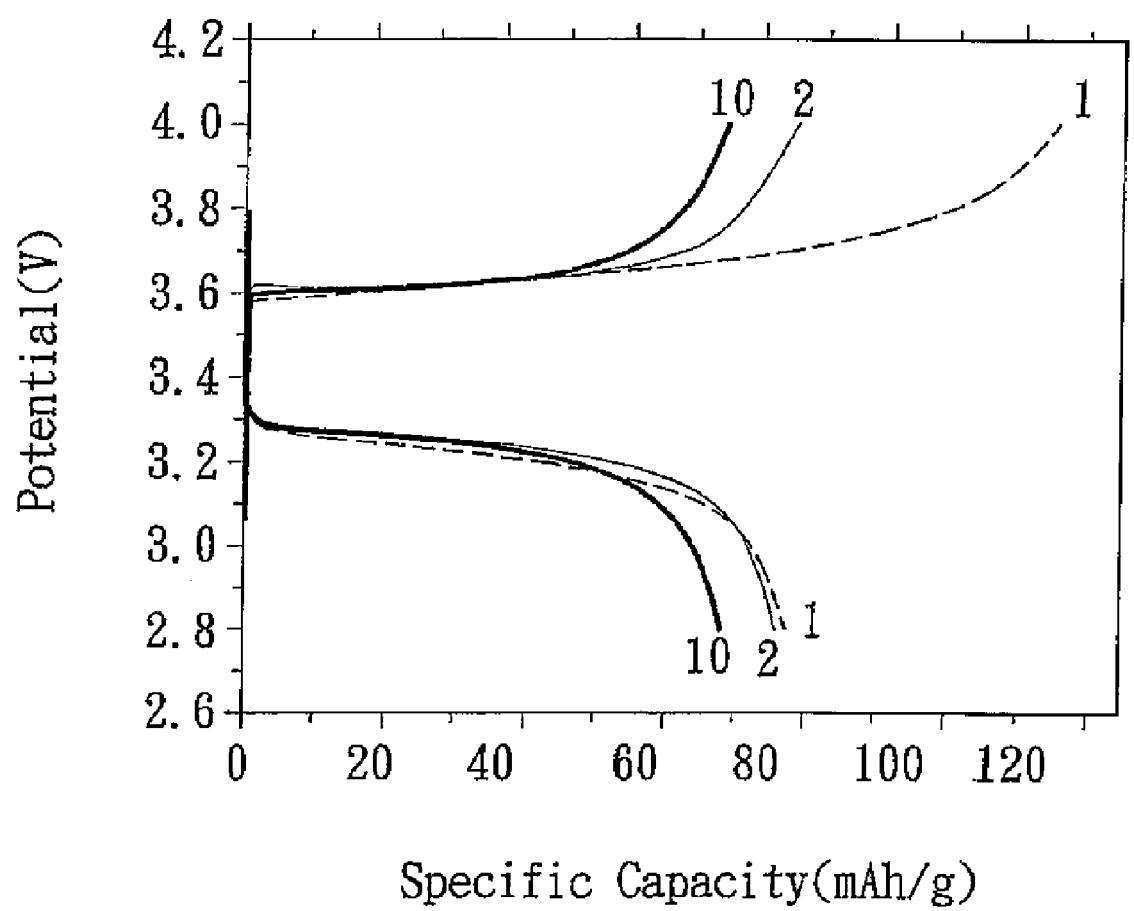
FIG. 9 shows a specific capacity (Q) versus voltage (V) plot for a rechargeable battery with a cathode made from a cathode material obtained from comparative Example B.

FIGS. 8 and 9 show specific capacity versus voltage plots for cathodes made from the cathode material ($LiFePO_4/ZnAlO_z/C$) in the rechargeable battery of Example B of this invention and the lithium ferrous phosphate powders in the rechargeable battery of comparative Example B, respectively. The applied charge/discharge voltage ranges from 2.8V to 4.0V; the charge/discharge rate is set to C/5; and the temperature is maintained at room temperature.

From the results shown in FIG. 8, the specific capacity of the initial discharge curve (lower curve 1) of the cathode in the rechargeable battery of Example B can reach to 105 mAh/g. After ten charge/discharge cycles, the specific capacity if the discharge curve (lower curve 10) of the cathode in the rechargeable battery of Example B can reach to 101 mAh/g. However, from the results shown in FIG. 9, the specific capacity of the initial discharge curve (lower curve 1) of the cathode in the rechargeable battery of comparative Example B can reach to 78 mAh/g. After ten charge/discharge cycles, the specific capacity of the discharge curve (lower curve 10) of the cathode in the rechargeable battery of comparative Example B can reach to 68 mAh/g. Apparently, inclusion of metal oxide in the cathodes material according to this invention will greatly improve the specific capacity of the rechargeable battery.

Note that the first compound of the cathode material of Example B was not heated under a nitrogen environment in the presence of a carbonaceous material. There are residual ferric ions present in the cathode material since heat treatment under nitrogen environment cannot completely reduce ferric ions to ferrous ions. The presence of residual ferric ions reduces the specific capacity of the rechargeable battery. If the cathode material of Example B is heated under a nitrogen environment in the presence of a carbonaceous material, the specific capacity of the rechargeable battery will be further improved.

Figure 10:
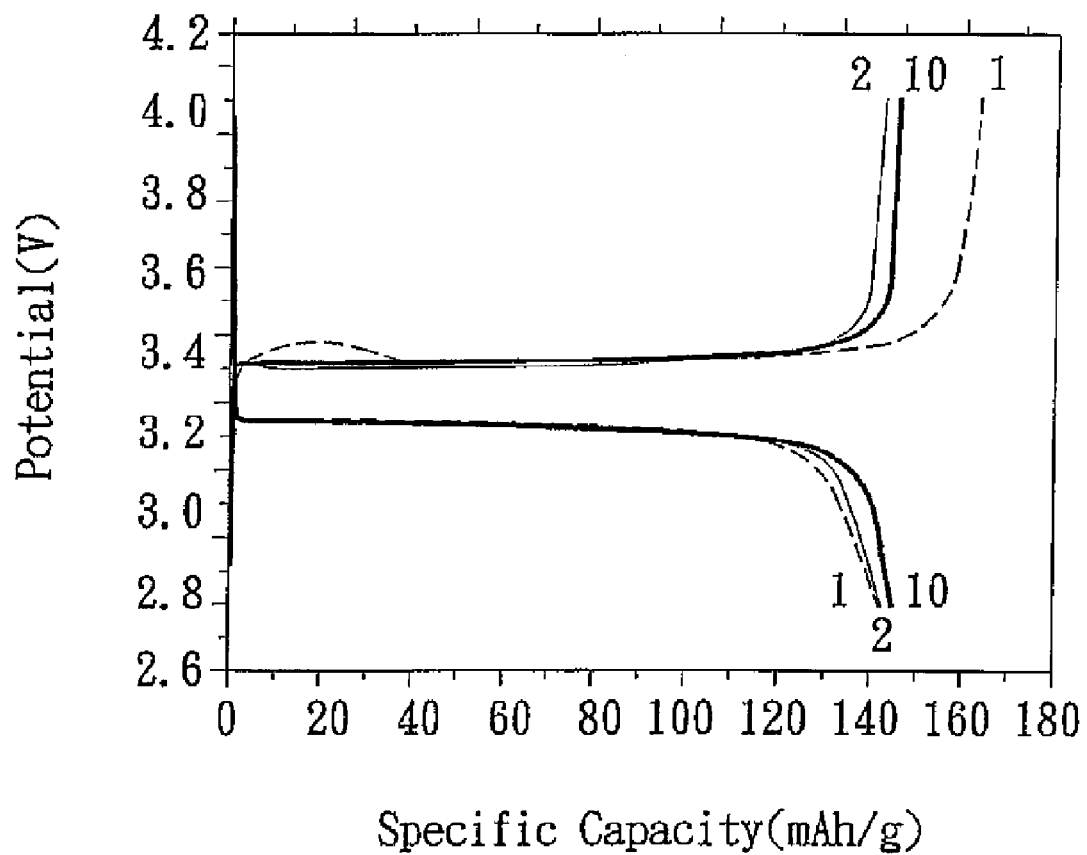
FIG. 10 shows a specific capacity (Q) versus voltage (V) plot for a rechargeable battery with a cathode made from a cathode material obtained from Example C of this invention.

FIG. 10 shows a specific capacity versus voltage plot for a cathode made from the cathode material (LiFePO$_4$/CuO/C) in the rechargeable battery of Example C of this invention. The applied charge/discharge voltage ranges from 2.8V to 4.2V; the charge/discharge rate is set to C/5; and the temperature is maintained at room temperature.

From the results shown in FIG. 10, the specific capacity of the initial discharge curve (lower curve 1) of the cathode in the rechargeable battery of Example C can reach to 142 mAh/g. After ten charge/discharge cycles, the specific capacity of the discharge curve (lower curve 10) of the cathode in the rechargeable battery of Example C can reach to 145 mAh/g. Therefore, inclusion of metal oxide and the carbonaceous material in the cathode material will greatly improve the specific capacity of the rechargeable battery.

Please refer to Table 1, which shows the specific capacity comparing between one charge/discharge cycle and then charge/discharge cycles of various second compound coated on the aggregation of particles of lithium ferrous phosphate. The applied charge/discharge voltage ranges from 2.8 V to 4.0V; the charge/discharge rate is set to C/5; and the temperature is maintained at room temperature. From the results shown in Table 1, the specific capacity of the first charge/discharge cycle of the cathode in the rechargeable battery of any second compound coated on the aggregation of particles of lithium ferrous phosphate is lower than that of ten charge/discharge cycles. Therefore, inclusion of second compound and the carbonaceous material in the cathode material will greatly improve the specific capacity of the rechargeable battery.

Compared with the conventional methods depicted in the background part, the cathodes material according to this invention can be manufactured by a more economical and environmental friendly method, operating conditions of which are easily controlled, and no pollutant discharge is produced.

Furthermore, the cathode material according to this invention can be used to form a cathode, which can be further combined with an anode and an electrolyte to constitute a rechargeable battery. By way of the combined second compound (such as SiC, BN or metal oxide) dispersed in and coated on the particles of the first compound, conductivity of the cathode material and diffusion rate of metal ions of the first compound, such as lithium ion, in the cathode material can be improved. In addition, the cathode made from such cathode material has good electrochemical reversibility, structural stability and thermostability and thus, is suitable for use in a rechargeable battery of large current output and in multiple series or parallel rechargeable battery units.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

TABLE 1

| Type of second compound | Specific capacity at first charge/discharge cycle | Specific capacity at 10th charge/discharge cycle |
|---|---|---|
| $Al_2O_3$ | 97 | 100 |
| $SiO_2$ | 106 | 115 |
| ZnO | 117 | 118 |
| CoO | 118 | 125 |
| MgO | 131 | 132 |
| NiO | 132 | 139 |
| $V_2O_5$ | 141 | 143 |
| $TiO_2$ | 144 | 146 |
| CuO | 149 | 145 |
| MnO | 150 | 155 |

What is claimed is:

1. A cathode material, comprising:
   a first compound having a formula of $A_{3x}M1_{2y}(PO_4)_3$, said first compound including plural micrometer-sized secondary particles, each of which has a particle size larger than 1 μm and is composed of crystalline nanometer-sized primary particles, each of which has a particle size ranging from 10 to 500 nm; and
   a second compound being at least one compound selected from the group consisting of SiC, BN and metal oxide having a formula of $M2_aO_b$ and coating on said first compound,
   wherein A is at least one element selected from the group consisting of elements of Groups IA, IIA and IIIA; each of M1 and M2 is at least one element selected from the group consisting of elements of Groups IIA, IIIA, IVA and VA and transition metal elements, respectively; and $0<x\leqq1.2$, $1.2\leqq y\leqq1.8$, $0<a\leqq7$, and $0<b\leqq6$.

2. The cathode material according to claim 1 wherein said first compound is powdered compound and has one of olivine and/or NASICON structures.

3. The cathode material according to claim 1 wherein A is at least one element selected from the group consisting of Li, Na, K, Be, Mg, B and Al.

4. The cathode material according to claim 1 wherein each of M1 and M2 is at least one element selected from the group consisting of Sc, Ti, V, Cr, Mn, Fe, Co, Ni, Cu, Zn, Y, Zr, Nb, Mo, Be, Mg, Ca, Sr, B, Al, Sn, Ga, In, Si, and Ge, respectively.

5. The cathode material according to claim 1 wherein each of said primary particles has a BET specific surface area ranging from 5 to 100 m$^2$/g.

6. The cathode material according to claim 1 wherein each of said micrometer-sized secondary particles has a particle size ranging from 1 μm to 50 μm.

7. The cathode material according to claim 1 wherein said second compound is substantially present in an amount less than 5% by weight based on total weight of said cathode material.

8. The cathode material according to claim 1 further comprising a carbonaceous component.

9. The cathode material according to claim 8 further comprising carbon particles adhered to the surfaces of said crystalline nanometer-sized primary particles of each of said micrometer-sized secondary particles.

10. The cathode material according to claim 9 wherein each of said micrometer-sized secondary particles is formed by sintering of contacted portions of surfaces of adjacent ones of said crystalline nanometer-sized primary particles.

11. The cathode material according to claim 9 wherein said carbonaceous component is substantially present in an amount less than 5% by weight based on total weight of said cathode material.

12. A cathode for a rechargeable battery, comprising an electrode plate and a coating of a cathode material coated on said electrode plate, wherein said cathode material comprises:
a first compound having a formula of $A_{3x}M1_{2y}(PO_4)_3$, said first compound including plural micrometer-sized secondary particles, each of which has a particle size larger than 1 μm and is composed of crystalline nanometer-sized primary particles, each of which has a particle size ranging from 10 to 500 nm; and
a second compound being at least one compound selected from the group consisting of SiC, BN and metal oxide having a formula of $M2_aO_b$ and coating on said first compound,
wherein A is at least one element selected from the group consisting of elements of Groups IA, IIA and IIIA; each of M1 and M2 is at least one element selected from the group consisting of elements of Groups IIA, IIIA, IVA and VA and transition metal elements, respectively; and $0<x\leq1.2$, $1.2\leq y\leq1.8$, $0<a\leq7$, and $0<b\leq6$.

13. The cathode according to claim 12 wherein said cathode material further comprises one of an aqueous binder and a non-aqueous binder.

14. The cathode according to claim 13 wherein said aqueous binder is styrene-butadiene rubber (SBR) and said non-aqueous binder is polyvinylidene fluoride (PVDF).

15. The cathode according to claim 12 wherein said cathode material further includes a thickener.

16. The cathode according to claim 15 wherein said thickener is carboxymethyl cellulose (CMC).

17. The cathode according to claim 12 wherein A is at least one element selected from the group consisting of Li, Na, K, Be, Mg, B and Al.

18. The cathode according to claim 12 wherein each of M1 and M2 is at least one element selected from the group consisting of Sc, Ti, V, Cr, Mn, Fe, Co, Ni, Cu, Zn, Y, Zr, Nb, Mo, Be, Mg, Ca, Sr, B, Al, Sn, Ga, In, Si, and Ge, respectively.

19. A rechargeable battery, including an anode, an electrolyte, and a cathode made from a cathode material comprising:
a first compound having a formula of $A_{3x}M1_{2y}(PO_4)_3$, said first compound including plural micrometer-sized secondary particles, each of which has a particle size larger than 1 μm and is composed of crystalline nanometer-sized primary particles, each of which has a particle size ranging from 10 to 500 nm; and
a second compound being at least one compound selected from the group consisting of SiC, BN and metal oxide having a formula of $M2_aO_b$ and coating on said first compound,
wherein A is at least one element selected from the group consisting of elements of Groups IA, IIA and IIIA; each of M1 and M2 is at least one element selected from the group consisting of elements of Groups IIA, IIIA, IVA and VA and transition metal elements, respectively; and $0<x\leq1.2$, $1.2\leq y\leq1.8$, $0<a\leq7$, and $0<b\leq6$.

20. The rechargeable battery according to claim 19 wherein A is at least one element selected from the group consisting of Li, Na, K, Be, Mg, B and Al; and each of M1 and M2 is at least one element selected from the group consisting of Sc, Ti, V, Cr, Mn, Fe, Co, Ni, Cu, Zn, Y, Zr, Nb, Mo, Be, Mg, Ca, Sr, B, Al, Sn, Ga, In, Si, and Ge, respectively.

* * * * *